(12) United States Patent
Breitenstein et al.

(10) Patent No.: US 8,609,807 B2
(45) Date of Patent: Dec. 17, 2013

(54) METHOD OF PRODUCING LOW-DUST GRANULES FROM POLYMER ADDITIVES

(75) Inventors: Benjamin Breitenstein, Rheinfelden (CH); Thomas Georg Gfrörer, Muttenz (CH); Rolf Waldner, Kaisten (CH); Pierre Lutz, Prattein (CH)

(73) Assignee: BASF SE, Ludwigshafen (DE)

( * ) Notice: Subject to any disclaimer, the term of this patent is extended or adjusted under 35 U.S.C. 154(b) by 1363 days.

(21) Appl. No.: 10/586,707

(22) PCT Filed: Jan. 14, 2005

(86) PCT No.: PCT/EP2005/050140
§ 371 (c)(1),
(2), (4) Date: Jul. 10, 2008

(87) PCT Pub. No.: WO2005/071008
PCT Pub. Date: Aug. 4, 2005

(65) Prior Publication Data
US 2009/0194617 A1     Aug. 6, 2009

(30) Foreign Application Priority Data

Jan. 23, 2004 (EP) .................................. 04100246

(51) Int. Cl.
*C08G 73/06* (2006.01)

(52) U.S. Cl.
USPC ............ 528/423; 264/141; 264/151; 241/125

(58) Field of Classification Search
USPC .................. 528/423; 264/141, 151; 241/125
See application file for complete search history.

(56) References Cited

U.S. PATENT DOCUMENTS

| | | | | |
|---|---|---|---|---|
| 4,457,775 A | * | 7/1984 | Legge et al. ................... | 428/403 |
| 4,842,794 A | * | 6/1989 | Hovis et al. ................... | 264/145 |
| 5,844,042 A | * | 12/1998 | Neri et al. ..................... | 523/223 |
| 6,225,375 B1 | | 5/2001 | Thibaut et al. ................ | 523/223 |
| 6,569,933 B1 | * | 5/2003 | Tonnvik et al. ............... | 524/444 |

FOREIGN PATENT DOCUMENTS

| | | |
|---|---|---|
| EP | 0514784 | 11/1992 |
| EP | 0565184 | 10/1993 |
| EP | 0719824 | 7/1996 |

* cited by examiner

*Primary Examiner* — Randy Gulakowski
*Assistant Examiner* — Shane Fang
(74) *Attorney, Agent, or Firm* — Tyler A. Stevenson

(57) ABSTRACT

The invention relates to a technically advantageous method of producing low-dust granules of polymer additives or polymer additive mixtures. The granule-forming polymer additives are mixed together, the mixture is converted into a workable mass and pressed through an orifice. The pre-shaped strand-like extruded mass is cooled and, while still in a workable state, formed into granules by rolling, impressing, cooling and comminuting.

7 Claims, No Drawings

METHOD OF PRODUCING LOW-DUST GRANULES FROM POLYMER ADDITIVES

The present invention relates to a method of producing low-dust granules from polymer additives.

Organic polymers, especially polyolefins, generally require the addition of additives in order to facilitate processing and to retain the in-use properties for as long a period as possible. Factors having a damaging effect on organic polymers, in addition to light and heat, also include residues of catalysts used during preparation. The prior art describes a large number of classes of substance that can be used as additives and stabilisers. On account of complex processes (not all of which have been explained in detail) that result in the degradation of organic polymers, mixtures of a plurality of additives are frequently used.

In general, the additives and additive mixtures are in powder form, which can be disadvantageous, examples of disadvantages including dust formation, tendency to separate and metering problems. There is therefore a need for commercial product forms which are not associated with those disadvantages. Examples of known methods include agglomeration methods, e.g. in aqueous phase, optionally with the use of a dispersant, mixing methods with binders, and compaction using a pellet press.

In many cases the resulting commercial product forms have shortcomings. They frequently contain water or binders, which are disadvantageous for incorporation into organic polymers. There is accordingly a need for granular additive mixtures having good in-use properties that comprise little or no binder. In addition, granular additive mixtures increasingly need to satisfy the relevant ecological criteria, for example low dust formation, savings in material through the omission of binder, etc.

U.S. Pat. No. 5,240,642 describes a method for producing granulated forms of additives for neutralising organic and inorganic acids and of tetrakis[3-(3,5-di-tert-butyl-4-hydroxyphenyl)-propionyloxymethyl]methane. That method is carried out in the presence of the last-mentioned material in the molten state, that material being distributed homogeneously throughout the pulverulent mass of the acid-neutralising agent, the mass being extruded, the extruded strands being cooled and granules then being formed. The granules so obtainable have disadvantages, however, in that they give rise to substantial amounts of dust.

European Patent Application No. 719 824 describes a method of producing low-dust calcium stearate granules, more specifically by heating calcium stearate or an additive mixture comprising calcium stearate and further polymer additives, extruding through a plate provided with nozzles or holes, the diameter of the nozzles or holes being from 1.0 to 10.0 mm, and subsequently forming the granules directly from the resulting extrudate while it is still in a plastic state (so-called "hot cut").

That method also has disadvantages, because for the extrusion the viscosity of the product mass has to be adjusted to a low value, by supplying or removing heat, such that the product mass remains plastic on passing through the orifices. This is especially critical in the case of additive mixtures, which have a tendency to harden. On the other hand, a high viscosity is required for cutting the product strands during granule formation in order that the product mass is prevented from adhering to the cutting device. There is therefore a need for an improved method which enables granules to be formed in a subsequent step, separately from the extrusion.

The present invention is based on a method in which only a small number of orifices or only one orifice is required for the extrusion and the granules are formed in a subsequent step.

The principle of the method according to the invention lies in providing the extruder with only a small number of orifices, preferably with only one orifice (hole or slot). The emerging pre-shaped plastic mass is then rolled out to the required granule thickness using a pair of rollers (calenders), deposited on a cooling belt and transported further. In the following step, the granule size is impressed into the resulting paste mat using shaping rollers. The underside of the belt is cooled in order to harden the plastic mass. At the end of the belt, the impressed hardened paste mat is subjected to preliminary breaking up into coarse pieces which are then broken into individual granules in a sieve granulator.

The invention relates to a technically advantageous method of producing low-dust granules of polymer additives or polymer additive mixtures (blends), wherein the granule-forming polymer additives are mixed together, the mixture is converted into a workable mass and pressed through an orifice, and the pre-shaped strand-like extruded mass is cooled and, while still in a workable state, formed into granules by rolling, impressing, cooling and comminuting.

The granules that can be produced in accordance with this method are uniformly shaped and are distinguished by excellent technical properties in respect of their further processing, especially advantageous bulk material properties, e.g. particle size adjustable from 1.0 to 10.0 mm, loose bulk density of more than 400 g/l, good flowability, e.g. pouring rates of from 2 to 40 sec (in accordance with DIN 53492 by measurement of $t_{R15}$ and $t_{R25}$, measurement of the pouring rate using a funnel having a defined outlet opening, e.g. 15 and 25 mm), angles of repose of the poured material of 30-40° In accordance with ISO 4324 (DIN ISO 4324), considerable resistance to attrition and freedom from dust, e.g. very low levels of dust in the Heubach test, and also good storage stability. They can therefore readily be metered into the organic polymers to be stabilised.

In the production of granules, a low dust content is an important criterion, which be determined in accordance with the so-called Heubach test in an experimental set-up that is similar to conditions in practice, the test material being kept in motion in order to determine the tendency to dust formation on the basis of dust emissions caused by attrition. The test apparatus is manufactured by Heubach Engineering, Langelsheim (DE). In the test, the test material (sample weight 50 g) is moved at 30 rpm (rotations per minute), corresponding to a circumferential speed of about 19 cm/sec, for 5 minutes in a dust production system having a capacity of 2.5 liters, wherein three baffles are arranged in the direction of rotation at an angle of 45' to the housing wall, while a current of air of 0.32 liter/sec deposits the fines component on a filter. The fine particles content determined in this way preferably does not exceed the value of 0.1% by weight.

In a preferred embodiment of the invention, there are mixed together as granule-forming polymer additives phenolic polymer additives of formula:

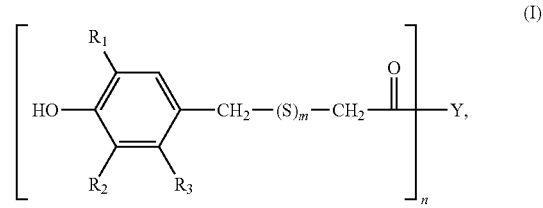

wherein, independently of one another, one of $R_1$ and $R_2$ is hydrogen, a substituent selected selected from the group $C_1$-$C_{18}$alkyl, phenyl, $(C_1$-$C_4$alkyl$)_{1-3}$-phenyl, phenyl-$C_1$-$C_3$alkyl, $(C_1$-$C_4$alkyl$)_{1-3}$phenyl-$C_1$-$C_3$alkyl, $C_5$-$C_{12}$cycloalkyl and $(C_1$-$C_4$alkyl$)_{1-3}C_5$-$C_{12}$cycloalkyl or a group of partial formula

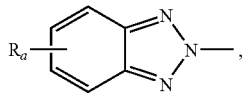

(A)

wherein $R_a$ is hydrogen or a substituent selected from the group $C_1$-$C_4$alkyl, halogen and sulfo;
and the other is a substituent selected from the group $C_1$-$C_{18}$alkyl, phenyl, $(C_1$-$C_4$alkyl$)_{1-3}$phenyl, phenyl-$C_1$-$C_3$alkyl, $(C_1$-$C_4$alkyl$)_{1-3}$phenyl-$C_1$-$C_3$alkyl, $C_5$-$C_{12}$cycloalkyl and $(C_1$-$C_4$alkyl$)_{1-3}C_5$-$C_{12}$cycloalkyl or a group of partial formula (A) wherein $R_a$ is as defined;
$R_3$ is hydrogen or methyl;
m is the number zero or 1; and
n is an integer from 1 to 4; wherein,
when n is the number 1,
m is zero or 1 and Y denotes
a monovalent substituent —O—$Y_1$ or —N(—$Y_2$)$_2$, wherein $Y_1$ is $C_5$-$C_{45}$alkyl, $C_3$-$C_{45}$alkyl interrupted by at least one oxygen atom, $C_5$-$C_{12}$cycloalkyl, $C_2$-$C_{12}$alkenyl,
a substituent of partial formula —CH$_2$—CH(OH)—CH$_2$—O—C(=O)—$R_b$,  (B), wherein $R_b$ is hydrogen, $C_1$-$C_8$alkyl, $C_3$-$C_5$alkenyl or benzyl,
a substituent of partial formula —CH$_2$—CH$_2$—O—$R_c$  (C), wherein $R_c$ is hydrogen, $C_1$-$C_{24}$alkyl, $C_5$-$C_{12}$cycloalkyl or phenyl, a substituent of partial formula —CH$_2$—CH$_2$—O—CHR$_d$—CHR$_e$—C(=O)—O—$R_f$  (D), wherein one of $R_d$ and $R_e$ is hydrogen or methyl and the other is methyl, and $R_f$ is hydrogen or $C_1$-$C_{24}$alkyl,
a substituent of partial formula

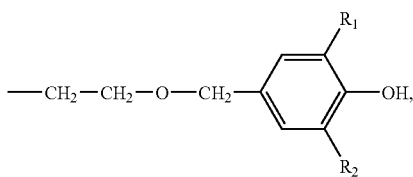

(E)

wherein $R_1$ and $R_2$ are as defined above,
or a substituent of partial formula —CH$_2$—CH$_2$—O—CH$_2$—C(=O)—O$R_g$  (F), wherein $R_g$ is hydrogen or $C_1$-$C_{24}$alkyl; and
$Y_2$ is hydroxy-$C_2$-$C_4$alkyl; or,
when n is the number 2,
m is zero and Y is a bivalent group of partial formula —O—$C_xH_{2x}$—O—  (G), wherein x is an integer from 2 to 20, —O—(CH$_2$—CH$_2$—O)$_y$—CH$_2$—CH$_2$—O—  (H), wherein y is an integer from 1 to 30,

—O—CH$_2$—CH$_2$—S—CH$_2$—CH$_2$—O—  (I),

—O—CH$_2$—CH$_2$=CH—CH$_2$—O—  (K) or

—NH—(CH$_2$)$_z$—NH—  (L), wherein z is zero or an integer from two to ten; or,
when n is the number 3, m is zero and Y is a trivalent group of partial formula

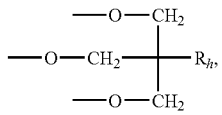

(M)

wherein $R_h$ is $C_1$-$C_{24}$alkyl or phenyl, or

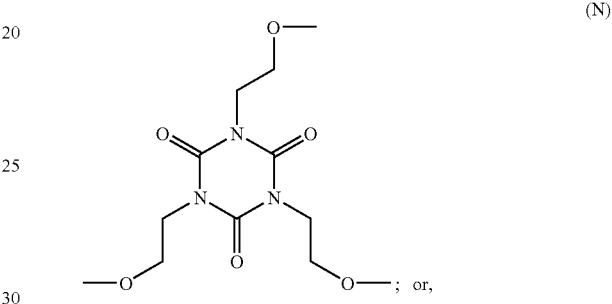

(N)

; or, when n is the number 4, m is zero and Y is the tetravalent group of partial formula

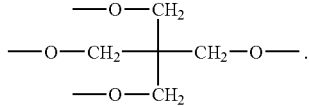

.

The alkyl groups of various chain lengths defined in the description of the present invention include linear and, where possible, branched hydrocarbon radicals, especially $C_1$-$C_9$alkyl, e.g. methyl, ethyl, isopropyl, n-butyl, isobutyl, tert-butyl, n-pentyl, neopentyl, isopentyl, n-hexyl, 2-ethylbutyl, 1-methylpentyl, 1,3-dimethylbutyl, n-heptyl, 3-heptyl, 1-methylhexyl, isoheptyl, n-octyl, 2-ethylhexyl, 1,1,3,3-tetramethylbutyl, 1-methylheptyl, n-nonyl or 1,1,3-trimethylhexyl, also $C_{10}$-$C_{45}$alkyl, especially straight-chain $C_{10}$-$C_{45}$alkyl, e.g. n-decyl, n-dodecyl, n-tetradecyl, n-hexadecyl, n-octadecyl, icosyl, henicosyl, docosyl or triacontyl, or branched $C_{10}$-$C_{22}$alkyl, e.g. 1,1,3-trimethylhexyl, 1-methylundecyl, 2-n-butyl-n-octyl, isotridecyl, 2-n-hexyl-n-decyl or 2-n-octyl-n-dodecyl, or higher homologues thereof. $(C_1$-$C_4$Alkyl$)_{1-3}$phenyl is e.g. 2- or 4-tolyl, 2,5- or 2,6-xylyl, mesityl, 2- or 4-ethylphenyl, 2,4- or 2,6-diethylphenyl, 4-cumenyl, 2-tert-butyl-6-methylphenyl or 2,6-bis-tert-butyl.

Phenyl-$C_1$-$C_3$alkyl is e.g. phenyl bonded to $C_1$-$C_3$alkyl in the 1-, 2- or 3-position, e.g. 2-phenylethyl, especially benzyl.

$(C_1$-$C_4$Alkyl$)_{1-3}$phenyl-$C_1$-$C_3$alkyl is one of the $(C_1$-$C_4$alkyl$)_{1-3}$phenyl radicals defined above bonded to $C_1$-$C_3$alkyl in the 1-, 2- or 3-position, e.g. 2-tert-butyl-6-methylbenzyl or 2,6-bis-tert-butylphenyl.

$C_5$-$C_{12}$Cycloalkyl is e.g. cyclopentyl or cyclohexyl.

$(C_1$-$C_4$Alkyl$)_{1-3}C_5$-$C_{12}$cycloalkyl is one of the $C_5$-$C_{12}$cycloalkyl groups defined above substituted by 1-3 $C_1$-$C_4$alkyl, e.g. 2- or 4-methylcyclohexyl, 2,6-dimethylcyclohexyl, 2,4,6-trimethyl-cyclohexyl or 4-tert-butylcyclohexyl.

Alkenyl is e.g. vinyl, allyl, 2-butenyl, methallyl, 2- or 3-hexenyl, or 3- or 5-decenyl.

In addition, the partial formula (A) defined above includes the following position isomer:

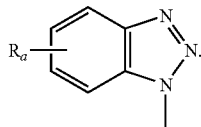
(A')

$R_a$, as halogen is bromine, iodine or, especially, chlorine.

In a compound (I), the index m is zero or one. When m is zero, this defines the direct bond.

In accordance with a further embodiment, the indices m and n are the number 1. Y is in that case the monovalent group —O—$Y_1$. Such compounds (I) correspond to formula:

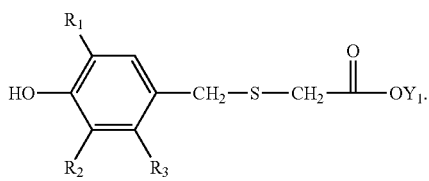
(Ia)

$Y_1$ as $C_3$-$C_{45}$alkyl interrupted by at least one —O— hetero atom includes the $C_3$-$C_{45}$alkyl groups mentioned above, especially 2-methoxyethyl, 2- or 3-methoxypropyl, 2-, 3- or 4-methoxybutyl, 2-ethoxyethyl, 2- or 3-ethoxypropyl, 2-, 3- or 4-ethoxybutyl, 2-n-propoxyethyl, 2- or 3-n-propoxypropyl, 2-, 3- or 4-n-propoxybutyl, 2-isopropoxyethyl, 2- or 3-isopropoxypropyl, 2-, 3- or 4 isopropoxybutyl, 2-n-butoxyethyl, 2- or 3-n-butoxypropyl, 2-, 3- or 4-n-butoxybutyl, 2-tert-butoxyethyl, 2- or 3-tert-butoxypropyl, 2-, 3- or 4-tert-butoxybutyl and higher homologues thereof, especially linear $C_6$-$C_{18}$alkyl substituted by methoxy, ethoxy, n-propoxy, isopropoxy or by tert-butoxy.

$R_b$ in a group of partial formula (A) is preferably hydrogen, allyl, methallyl or benzyl.

$R_c$, in a group of partial formula (C) is preferably hydrogen or $C_1$-$C_4$alkyl.

$Y_2$ as hydroxy-$C_2$-$C_4$alkyl is preferably 2-hydroxyethyl.

An especially preferred group of compounds (I), wherein m is zero and defines the direct bond and n is one, corresponds to general formulae:

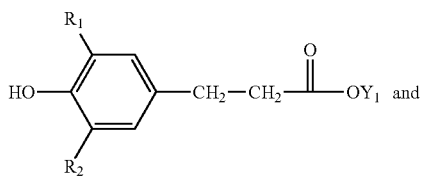
(Ib)

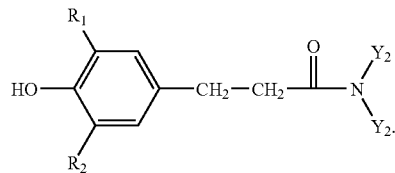
(Ic)

In those compounds, one of $R_1$ and $R_2$ is methyl or tert-butyl and the other of $R_1$ and $R_2$ is tert-butyl, $Y_1$ is straight-chain or branched $C_{10}$-$C_{22}$alkyl and $Y_2$ is 2-hydroxyethyl.

A further especially preferred group of compounds (I), wherein m is zero and defines the direct bond and n is one, corresponds to the general formula:

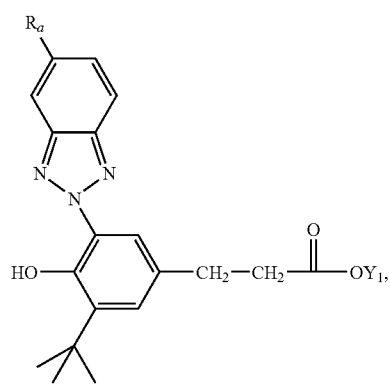
(Id)

wherein $R_a$ is hydrogen or chlorine and $Y_1$ is straight-chain or branched $C_{10}$-$C_{22}$alkyl.

In accordance with a preferred further embodiment there are mixed together as granule-forming polymer additives phenolic polymer additives (I) wherein n is the number 2 and m is zero. Y denotes a bivalent substituent selected from the group $$—O—C_xH_{2x}—O— \quad (G),$$

wherein x is an integer from 2 to 20, $$—O—(CH_2—CH_2—O)_y—CH_2—CH_2—O— \quad (H),$$

wherein y is an integer from 1 to 30, $$—O—CH_2—CH_2—S—CH_2—CH_2—O— \quad (I),$$

$$—O—CH_2—CH_2=CH—CH_2—O— \quad (K) \text{ or}$$

$$—NH—(CH_2)_z—NH— \quad (L),$$

wherein z is zero or an integer from 2 to 10.

Preferred compounds correspond to the formulae

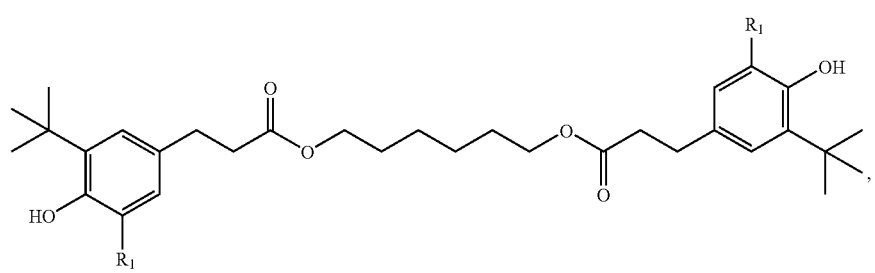

-continued
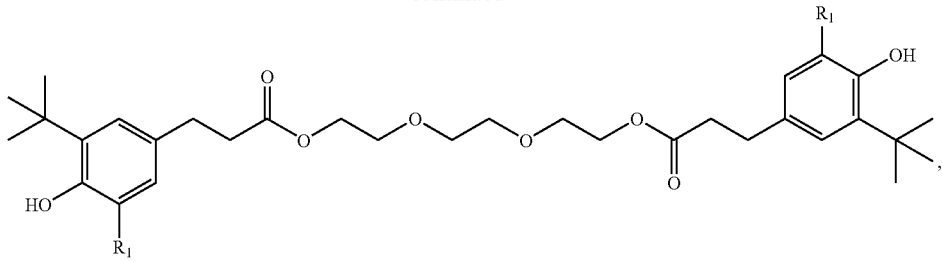
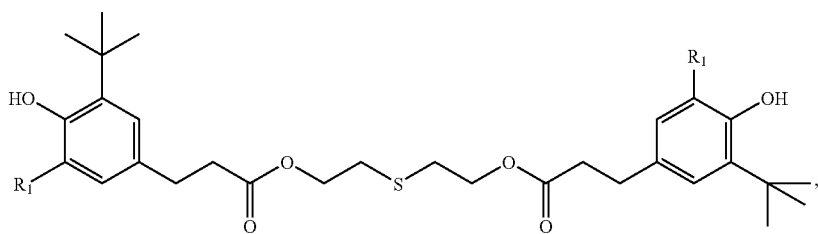
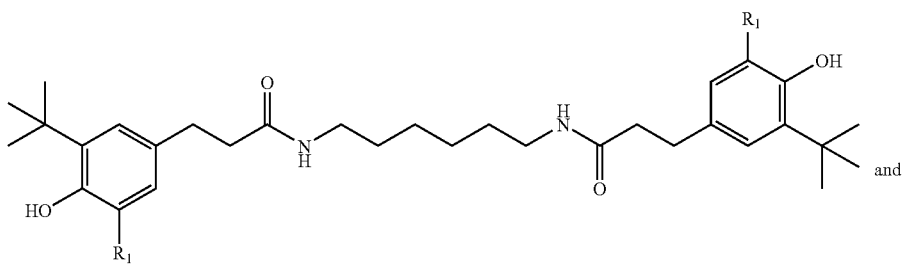
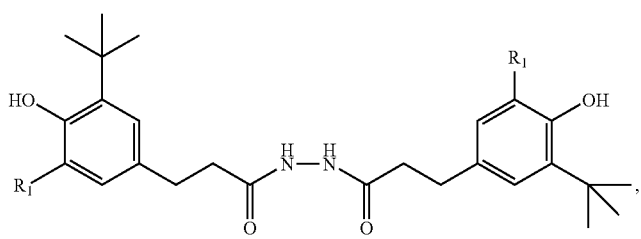
wherein R₁ is hydrogen or tert-butyl.
A further preferred embodiment relates to the preparation of compounds (I) wherein n is the number 3, m is zero and Y is the trivalent group
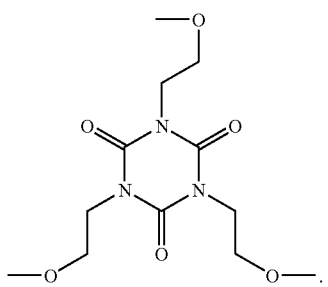
(L)

Such a compound corresponds to formula

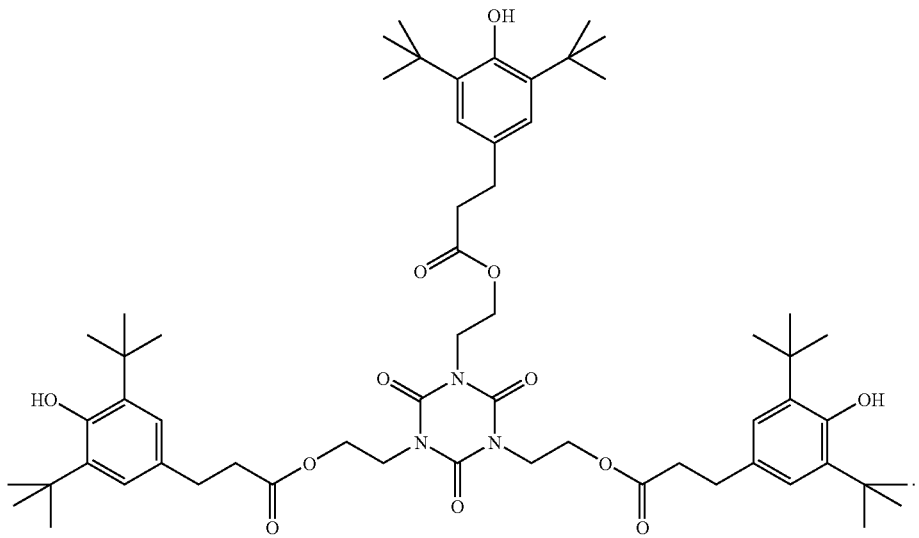 [SMILES: CC(C)(C)c1cc(CCC(=O)OCCn2c(=O)n(CCOC(=O)CCc3cc(C(C)(C)C)c(O)c(C(C)(C)C)c3)c(=O)n(CCOC(=O)CCc3cc(C(C)(C)C)c(O)c(C(C)(C)C)c3)c2=O)cc(C(C)(C)C)c1O]

A further preferred embodiment relates to the preparation of compounds (I) wherein n is the number 4 and m is zero. Such a compound corresponds to formula

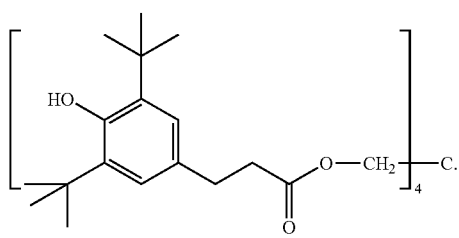

In a further preferred embodiment of the invention there are mixed together as granule-forming polymer additives phenolic polymer additives (I) wherein one of $R_1$ and $R_2$ is methyl, tert-butyl or the group (A) wherein $R_a$ is hydrogen or chlorine, and the other of $R_1$ and $R_2$ is tert-butyl;

$R_3$ is hydrogen;

m is zero or the number 1; and n is an integer from 1 to 4; wherein, when n is the number 1, m is zero or the number 1 and Y denotes a monovalent group —O—$Y_1$ or —N(—$Y_2$)$_2$ or n is the number 2, m is zero and Y denotes a bivalent group of partial formula (D), (E), (F), (G) or (H); or n is the number 3, m is zero and Y denotes a trivalent group of partial formula (K) or (L); or n is the number 4 and m is zero and Y denotes a tetravalent group of partial formula (M).

In accordance with an especially preferred embodiment there are mixed together as granule-forming polymer additives phenolic polymer additives of formula:

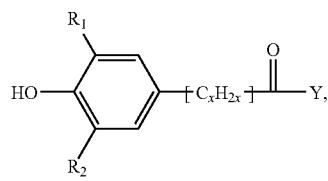

wherein, independently of one another, one of $R_1$ and $R_2$ is hydrogen or $C_1$-$C_4$alkyl and the other is $C_3$-$C_4$alkyl; x is zero (direct bond) or an integer from one to three; and Y is $C_8$-$C_{22}$alkoxy or a group of partial formula

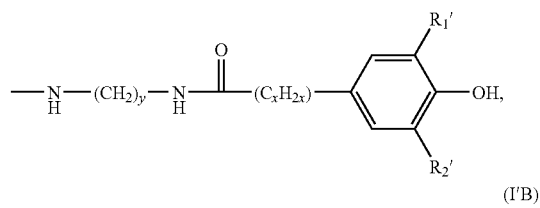

(I'A)

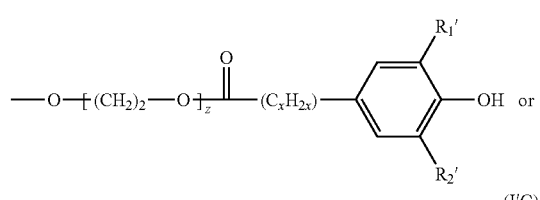

(I'B)

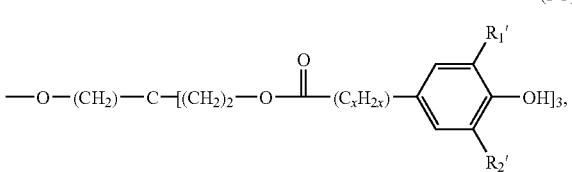

(I'C)

wherein, independently of one another, one of $R_1'$ and $R_2'$ is hydrogen or $C_1$-$C_4$alkyl and the other is $C_3$-$C_4$alkyl; x is zero (direct bond) or an integer from one to three; y is an integer from two to ten and z is an integer from two to six.

The following further polymer additives can be mixed together with the above-described granule-forming phenolic polymer additives to form so-called blends:

1. Antioxidants 1.1 Alkylated monophenols, e.g. 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha,\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, straight-chain or branched nonylphenols; e.g. 2,6-dinonyl-4-methylphenol, 2,4-dimethyl-6-(1-methylundec-1'-yl)-phenol, 2,4-dimethyl-6-(1'-methyl-heptadec-1'-yl)-phenol, 2,4-dimethyl-6-(1'-methyltridec-1'-yl)-phenol and mixtures thereof.

1.2 Alkylthiomethylbhenols, e.g. 2,4-dioctylthiomethyl-6-tert-butylphenol, 2,4-dioctylthio-methyl-6-methylphenol, 2,4-dioctylthiomethyl-6-ethylphenol, 2,6-didodecylthiomethyl-4-nonylphenol.

1.3 Hydroluinones and alkylated hydroquinones, e.g. 2,6-di-tert-butyl-4-methoxyphenol, 2,5-di-tert-butylhydroquinone, 2,5-di-tert-amylhydroquinone, 2,6-diphenyl-4-octadecyloxy-phenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxyphenyl)adipate.

1.4 Tocopherols, e.g. $\alpha$-, $\beta$-, $\gamma$- or $\delta$-tocopherols and mixtures thereof (vitamin E).

1.5 Hydroxylated thiodiphenyl ethers, e.g. 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxy-phenyl) disulfide.

1.6 Alkylidene-bis-phenols, e.g. 2,2'-methylene-bis(6-tert-butyl-4-methylphenol), 2,2'-methylene-bis(6-tert-butyl-4-ethylphenol), 2,2'-methylene-bis[4-methyl-6-($\alpha$-methylcyclohexyl)-phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-($\alpha$-methylbenzyl)-4-nonylphenol], 2,2'-methylene-bis[6-($\alpha,\alpha$-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxy-phenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydrooxy-2-methylphenyl)pentane.

1.7 O-, N- and S-benzyl compounds, e.g. 3,5,3',5'-tetra-tert-butyl-4,4'-dihydroxydibenzyl ether, octadecyl 4-hydroxy-3,5-dimethylbenzyl mercaptoacetate, tridecyl 4-hydroxy-3,5-di-tert-butylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl) sulfide, isooctyl 3,5-di-tert-butyl-4-hydroxybenzyl mercaptoacetate.

1.8 Hydroxybenzylated malonates, e.g. dioctadecyl 2,2-bis(3,5-di-tert-butyl-2-hydroxybenzyl) malonate, dioctadecyl 2-(3-tert-butyl-4-hydroxy-5-methylbenzyl) malonate, didodecyl mercaptoethyl-2,2-bis(3,5-di-tert-butyl-4-hydroxybenzyl), malonate, di-[4-(1,1,3,3-tetramethylbutyl)phenyl]-2,2-bis(3,5-di-tert-butyl-4-hydroxybenzyl) malonate.

1.9 Aromatic hydroxybenzyl compounds, e.g. 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl-benzene, 2,4,6-tris(3,5-di-tert-butyl-4-hydroxybenzyl)phenol.

1.10 Triazine compounds, e.g. 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxy-benzyl) isocyanurate.

1.11 Benzyl phosphonates, e.g. dimethyl-2,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of the monoethyl ester of 3,5-di-tert-butyl-4-hydroxybenzylphosphonic acid.

1.12 Acylaminophenols, e.g. 4-hydroxylauranilide, 4-hydroxystearanilide, octyl-N-(3,5-di-tert-butyl-4-hydroxyphenyl) carbamate.

1.13 Ascorbic acid (vitamin C).

1.14 Aminic antioxidants, e.g. N,N'-diisopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenyl-amine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, di(4-methoxyphenyl)-amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diamino-diphenylmethane, 1,2-di[(2-methylphenyl)amino]ethane, 1,2-diphenylaminopropane, o-tolylbiguanide, di[4-(1',3'-dimethylbutyl)phenyl]amine, tert-octylated N-phenyl-1-naphthylamine, a mixture of mono- and di-alkylated tert-butyl-/tert-octyl-diphenylamines, a mixture of mono- and di-alkylated nonyldiphenylamines, a mixture of mono- and di-alkylated dodecyldiphenylamines, a mixture of mono- and di-alkylated isopropyl-/isohexyl-diphenylamines, mixtures of mono- and di-alkylated tert-butyldiphenylamines, 2,3-dihydro-3,3-dimethyl-4H-1,4-benzo-thiazines, phenothiazines, a mixture of mono- and di-alkylated tert-butyl-/tert-octyl-pheno-thiazines, a mixture of mono- and di-alkylated tert-octyl-phenothiazines, N-allylpheno-thiazines, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl) sebacate, 2,2,6,6-tetramethylpiperidin-4-one and 2,2,6,6-tetramethylpiperidin-4-ol.

1.15 Polyphenolic antioxidants, e.g. derivatives of p-cresol and dicyclopentadiene, e.g. ®WINGSTAY L (Goodyear), CAS-No. 68610-51-5.

2. UV Absorbers and light stabilisers 2.1 2-(2'-Hydroxyphenyl)benzotriazoles, e.g. 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)-benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methyl-phenyl)-5-chlorobenzotriazole, 2-(3'-sec-butyl-5'-tert-butyl-2'-hydroxyphenyl)benzo-triazole, 2-(2'-hydroxy-4'-octyloxyphenyl)benzotriazole, 2-(3',5'-di-tert-amyl-2'-hydroxy-phenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethyl-hexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)-phenylbenzotriazole, 2,2'-methylene-bis[4-(1,1,3,3-tetramethylbutyl)-6-benzotriazol-2-yl-phenol]; the transesterification product of 2-[3'-tert-butyl-5'-(2-methoxycarbonylethyl)-2'-hydroxyphenyl]-2H-benzotriazole with polyethylene glycol 300;

wherein R is 3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzo-triazole; 2-[2'-hydroxy-3'-(1,1,3,3-tetramethylbutyl)-5'-(α,α-dimethylbenzyl)phenyl]benzo-triazole.

2.2 2-Hydroxybenzophenones, e.g. the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivatives.

2.3 Benzoic acid esters. e.g. 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

2.4 Acrylates, e.g. ethyl-α-cyano-β,β-diphenylacrylate or isooctyl-α-cyano-β,β-diphenyl-acrylate, methyl-α-carbomethoxycinnamate, methyl-α-cyano-β-methyl-p-methoxycinnamate or butyl-α-cyano-β-methyl-p-methoxycinnamate, methyl-α-carbomethoxy-p-meth-oxycinnamate and N-(α-carbomethoxy-β-cyanovinyl)-2-methylindoline.

2.5 Nickel compounds, e.g. nickel complexes of 2,2'-thio-bis [4-(1,1,3,3-tetramethylbutyl)-phenol], e.g. the 1:1 or 1:2 complex, optionally with further ligands, e.g. n-butylamine, triethanolamine or N-cyclohexyldiethanolamine, nickel dibutyldithiocarbamate, nickel salts of monoalkyl esters, e.g. methyl or ethyl esters, 4-hydroxy-3,5-di-tert-butylbenzylphos-phonic acid, nickel complexes of ketoximines, e.g. 2-hydroxy-4-methylphenylundecyl-ketoximes or nickel complexes of 1-phenyl-4-lauroyl-5-hydroxypyrazole, optionally with further ligands.

2.6 So-called sterically hindered amines, e.g. bis(2,2,6,6-tetramethylpiperidin-4-yl) sebacate, bis(2,2,6,6-tetramethylpiperidin-4-yl) succinate, bis(1,2,2,6,6-pentamethylpiperidin-4-yl) sebacate, bis(1-octyloxy-2,2,6,6-tetramethylpiperidin-4-yl) sebacate, bis(1,2,2,6,6-pentamethylpiperidyl)-n-butyl-3,5-di-tert-butyl-4-hydroxybenzyl malonate, the condensate of 1-hydroxyethyl-2,2,6,6-tetramethyl-4-hydroxypiperidine and succinic acid, the linear or cyclic condensate of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilo-triacetate, tetrakis(2,2,6,6-tetramethyl-4-piperidyl)-1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triaza-spiro[4.5]decane-2,4-dione, bis(1-octyloxy-2,2,6,6-tetramethylpiperidyl) sebacate, bis(1-octyloxy-2,2,6,6-tetramethylpiperidyl) succinate, the linear or cyclic condensate of N,N'-bis(2,2,6,6-tetramethyl-4-piperidyl)hexamethylenediamine and 4-morpholino-2,6-dichloro-1,3,5-triazine, the condensate of 2-chloro-4,6-di(4-n-butylamino-2,2,6,6-tetramethyl-piperidyl)-1,3,5-triazine and 1,2-bis(3-aminopropylamino)ethane, the condensate of 2-chloro-4,6-di(4-n-butylamino-1,2,2,6,6-pentamethylpiperidyl)-1,3,5-triazine and 1,2-bis(3-aminopropylamino) ethane, 8-acetyl-3-dodecyl-7,7,9,9-tetramethyl-1,3,8-triazaspiro-[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexa-decyloxy- and 4-stearyloxy-2,2,6,6-tetramethylpiperidine, the condensate of N,N'-bis(2,2,6,6-tetramethyl-4-piperidyl)-hexamethylenediamine and 4-cyclohexylamino-2,6-di-chloro-1,3,5-triazine, the condensate of 1,2-bis(3-aminopropylamino)ethane and 2,4,6-trichloro-1,3,5-triazine and 4-butylamino-2,2,6,6-tetramethylpiperidine (CAS No. 136504-96-6); N-(2,2,6,6-tetramethyl-4-piperidyl)-n-dodecylsuccinimide, N-(1,2,2,6,6-penta-methyl-4-piperidyl)-n-dodecylsuccinimide, 2-undecyl-7,7,9,9-tetramethyl-1-oxa-3,8-diaza-4-oxospiro[4.5]decane, the reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ether, N,N'-bis-formyl-N,N'-bis(2,2,6,6-tetra-methyl-4-piperidyl)hexamethylenediamine, the diester of 4-methoxymethylenemalonic acid with 1,2,2,6,6-pentamethyl-4-hydroxypiperidine, poly[methylpropyl-3-oxy-4-(2,2,6,6- tetramethyl-4-piperidyl)]siloxane, the reaction product of maleic anhydride/α-olefin co-polymer and 2,2,6,6-tetramethyl-4-aminopiperidine or 1,2,2,6,6-pentamethyl-4-amino-piperidine.

2.7 Oxalamides, e.g. 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and the mixture with 2-ethoxy-2'-ethyl-5,4'-di-tert-butyloxanilide and mixtures of o- and p-methoxy- and o- and p-ethoxy-disubstituted oxanilides.

2.8 2-(2-Hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-di-methylphenyl)-1,3,5-triazine, 2-(2-hydroxy-4-tridecyloxyphenyl)-4,6-bis(2,4-dimethyl-phenyl)-1,3,5-triazine, 2-[2-hydroxy-(2-hydroxy-3-butoxypropyloxy)phenyl]-4,6-bis(2,4-dimethylphenyl)-1,3,5-triazine, 2-[2-hydroxy-4-(2-hydroxy-3-octyloxypropyloxy)-phenyl]-4,6-bis(2,4-dimethylphenyl)-1,3,5-triazine, 2-[4-(dodecyloxy/tridecyloxy-2-hydroxyprop-oxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethyl-phenyl)-1,3,5-triazine.

3. Metal deactivators, e.g. N,N'-diphenyloxalamide, N-salicylal-N'-salicyloylhydrazine, N,N'-bis(salicyloyl)hydrazine, N,N'-bis(3,5-di-tert-butyl-4-hydroxyphenyl-propionyl)hydrazine, 3-salicyloylamino-1,2,4-triazole, bis(benzylidene)oxalyl dihydrazide, oxanilide, isophthaloyl-dihydrazide, sebacoylbisphenyl hydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites, phosphines and phosphonites, e.g. triphenyl phosphite, diphenyl alkyl-phosphites, phenyl dialkylphosphites, trisnonylphenyl phosphite, trilauryl phosphite, trioctadecyl phosphite, trimethylphosphine, tri-n-butylphosphine, triphenylphosphine, distearylpentaerythritol diphosphite, tris(2,4-di-tert-butylphenyl) phosphite, diisodecyl-pentaerythritol diphosphite, bis(2,4-di-tert-butylphenyl)pentaerythritol diphosphite, bis(2,6-di-tert-butyl-4-methylphenyl)pentaerythritol diphosphite, bisisodecyloxypentaerythritol diphosphite, bis(2,4-di-tert-butyl-6-methylphenyl)pentaerythritol diphosphite, bis(2,4,6-tri-tert-butylphenyl)pentaerythritol diphosphite, tristearylsorbitan triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methyl phenyl)methyl phosphite, bis(2,4-di-tert-butyl-6-methylphenyl)ethyl phosphite, 2,2',2"-nitrilo[triethyl-tris-(3,3',5,5"-tetra-tert-butyl-1,1'-biphenyl-2,2'-diyl)phosphite], 2-ethylhexyl(3,3',5,5'-tetra-tert-butyl-1,1'-biphenyl-2,2'-diyl) phosphite.

The following phosphites are especially preferred:
tris(2,4-di-tert-butylphenyl) phosphite (Irgafos® 168, Ciba Specialty Chemicals), trisnonyl-phenyl phosphite and the phosphites having the structural formulae (a), (b), (c), (d), (e), (f) and (g):

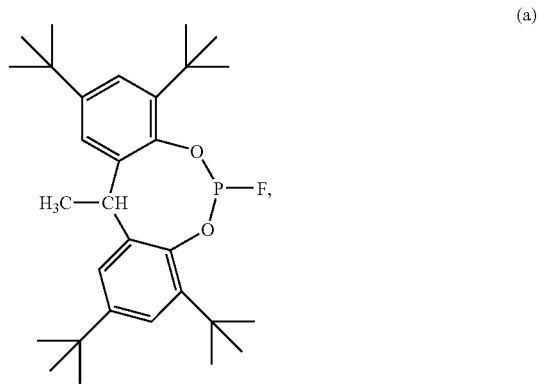

(a)

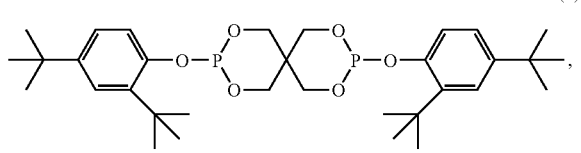

(b)

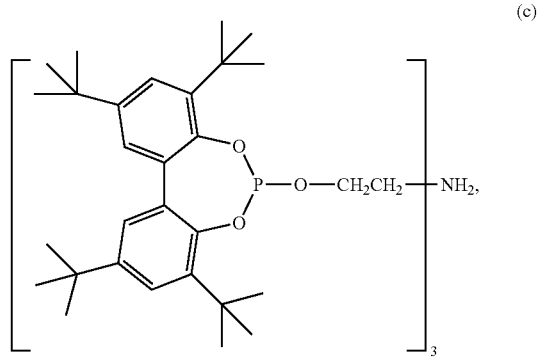

(c)

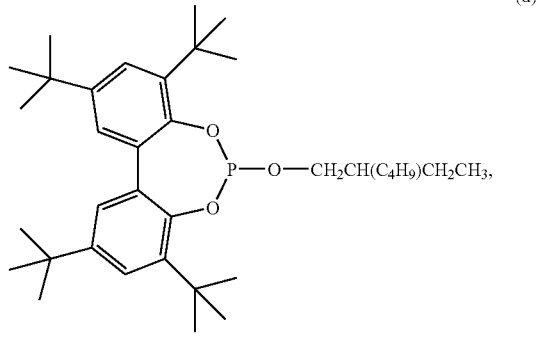

(d)

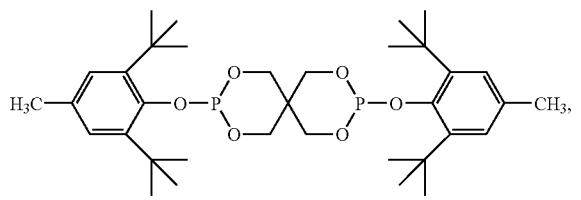

(e)

-continued

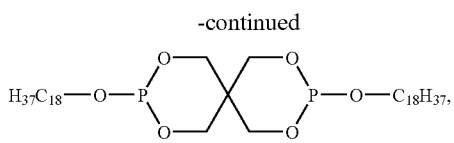
(f)

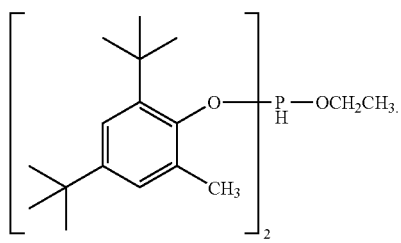
(g)

5. Hydroxylamines, e.g. N,N-dibenzylhydroxylamine, N,N-diethylhydroxylamine, N,N-dioctyl-hydroxylamine, N,N-dilaurylhydroxylamine, N,N-ditetradecylhydroxylamine, N,N-dihexa-decylhydroxylamine, N,N-dioctadecylhydroxylamine, N-hexadecyl-N-octadecylhydroxyl-amine, N-heptadecyl-N-octadecylhydroxylamine, N,N-dialkylhydroxylamine from hydrogenated tallow fatty acid amines.
6. Nitrones, e.g. N-benzyl-α-phenylnitrone, N-ethyl-α-methylnitrone, N-octyl-α-heptylnitrone, N-lauryl-α-undecylnitrcne, N-tetradecyl-α-tridecylnitrone, N-hexadecyl-α-pentadecyl-nitrone, N-octadecyl-α-heptadecylnitrone, N-hexadecyl-α-heptadecylnitrone, N-octadecyl-α-pentadecylnitrone, N-heptadecyl-α-heptadecylnitrone, N-octadecyl-α-hexadecylnitrone and nitrones from N,N-dialkylhydroxylamines of hydrogenated tallow fatty acid amines.
7. Thiosynergists, e.g. dilauryl- or distearyl-thiodipropionate.
8. Peroxide absorbers, e.g. esters of α-thiodipropionic acid, e.g. the lauryl, stearyl, myristyl or tridecyl esters, mercaptobenzimidazoles, the zinc salt of 2-mercaptobenzimidazole, zinc dibutyl dithiocarbamate, dioctadecyl disulfide, pentaerythritol tetrakis(β-dodecylmercapto)-propionate.
9. Polyamide stabilisers, e.g. the copper salts combined with iodides and/or phosphorus compounds and salts of divalent manganese.
10. Basic costabilisers, e.g. melamine, polyvinylpyrrolidone, dicyandiamide, triallylcyanurate, urea derivatives, hydrazine derivatives, amines, polyamides, polyurethanes, alkali metal and alkaline earth metal salts of higher fatty acids, e.g. calcium stearate, zinc stearate, magnesium behenate or stearate, sodium ricinoleate, potassium palmitate, antimony or zinc pyrocatecholate.
11. Nucleating agents, e.g. inorganic fillers, e.g. talcum, metal oxides, e.g. titanium dioxide or magnesium oxide, phosphates, carbonates or sulfates, preferably of alkaline earth metals, organic acids, e.g. mono- or poly-carboxylic acids and their salts, e.g. 4-tert-butylbenzoic acid, adipic acid, diphenylacetic acid, sodium succinate or benzoate and also polymeric compounds, e.g. ionic copolymers (ionomers).
12. Benzofuranones and indolinones, e.g. according to U.S. Pat. No. 4,325,863; U.S. Pat. No. 4,338,244; U.S. Pat. No. 5,175,312, U.S. Pat. No. 5,216,052; U.S. Pat. No. 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethyl-phenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.
13. Further additives, e.g. plasticisers, lubricants, emulsifiers, pigments, flow agents, catalysts, fluorescent whiteners, antistatic agents or blowing agents.

The granule-forming additives and additive mixtures described above are mixed together in a manner known per se, there being suitable, for example, so-called ko-kneaders, co-rotating and counter-rotating twin-screw extruders or single-screw extruders, which are suitable for the mixing, kneading, incorporation, plastification and homogenisation of thermoplastic and curable plastics, for the dispersion of dyes and for other processes in the viscoelastic phase, e.g. ko-kneaders of the K and M types, especially ko-kneaders of the PR type, which allow specific outputs of up to 1 kW per kg of processed mass per hour. Especially suitable apparatus are ko-kneaders of the PR type from Buss AG, CH-Pratteln, e.g. apparatus types PR 100, 140, 200 or 300. In accordance with the ko-kneader principle, the mixing and kneading work is distributed between a plurality of small elements, e.g. kneading teeth and helical blades. Operation is continuous or discontinuous, according to the batch. For continuous operation it is important to have uniform supply of material, which can be effected by means of metering devices for liquids, melts or pulverulent to pasty materials.

The conversion of the mixture into a workable mass is preferably effected in a temperature-controlled ko-kneader, co-rotating or counter-rotating twin-screw extruder or single-screw extruder. By virtue of thermal and mechanical (shear) energy, the additives are mixed and processed into a workable mass. The housing and screw of the ko-kneader can be heated individually in a plurality of zones, e.g. using double-jacket heating. Temperature ranges of from 20° C. to 300° C. are preferred. The filling zone is preferably cooled. The outlet nozzle is specially shaped and has a small number of orifices, preferably only one orifice. It may be, for example, in the form of an injection head, strip- or slot-shaped nozzle, circular nozzle or spiral nozzle. The orifices in the outlet nozzles are from about 40 mm to about 200 mm in length, from about 6 mm to about 20 mm in width or, in the case of circular nozzles, are from about 20 mm to about 150 mm in diameter.

On leaving the outlet nozzle, the strand-like extruded mass so pre-shaped is in a non-rigid state, e.g. a plastic or plastic-crystalline state, that is capable of further shaping. The extruded mass has a viscosity of about from 1000 to 50 000 cPa·sec, preferably from 1000 to 10 000 cPa·sec. The extruded mass is cooled to a temperature at which it still remains workable. The mass can be discharged by means of a slide chute, which can be provided with a non-stick coating.

As an alternative to ko-kneaders there are used screw extruders which may be provided with one or two screws (single-screw or multi-screw extruders, e.g. twin-screw extruders), it being possible for the screws to be provided with the same or different windings (shear elements and mixing components). The use of ko-kneaders is preferred. Reference is made to the apparatus described in *Handbuch der Kunststoffextrusion*, Editors F. Hensen, W Knappe, H. Potente, Vol. 1, 1989, Grundlagen, ISBN: 3-446-14339-4, and Vol. 2, 1986, Extrusions-anlagen, ISBN 3446-14329-7. Analogous apparatus is obtainable from the manufacturers Brabender (DE), Werner & Pfleiderer (DE) or Bühler (CH). While it is still in a workable state, the cooled mass is then formed into granules by rolling, impressing, cooling and comminuting. For rolling there is used a rolling method derived from so-called calendering and known from the production of plastics films. The conventional calendering method consists of forming thermoplastic masses into endless strips by passing them through at least two rollers, so-called nip or squeeze rollers.

The impressing process used in the method of the present invention differs from calendering methods in that, after rolling, the still plastic, pre-shaped mass is then processed using linearly embossed shaping rollers. The material is thus impressed with a granular structure, which is necessary for the provison of predetermined breaking points for comminuting the hardened fragments of the product mat.

During impressing, transport can be effected on a continuous steel belt of the Sandvik type, which is provided with a controllable drive and is coolable by water being sprayed onto its underside. The steel belt can have a belt width of from about 200 mm to about 1500 mm and an effective cooling length of from about 2 m to about 16 m.

The rolling is effected by passing the pre-shaped, still plastic material through two or three squeeze rollers, the spacing between the rollers being adjustable and the smallest spacing governing the size of the granules. The plastic material that has been thus rolled out is then processed by at least one, preferably two or three, rollers which impart an impressed structure to the material. In a preferred embodiment, those shaping rollers have diagonal grooves running in opposite directions or grooves running longitudinally and transversely, which impress rhombic or square structures into the still plastic strip of material.

There are at least two possible arrangements of the squeeze rollers (overhead and underneath). When they are arranged overhead, the plastic material emerging from the outlet nozzle is guided upwards by the transport belt, it being possible for the transport belt to be cooled or heated. When they are arranged underneath, the plastic material is guided downwards upstream of the first squeeze roller.

The squeeze rollers and shaping rollers can be arranged as in conventional calenders, which, as necessary, may be heated or, especially, cooled. The rotational speed of the rollers has to be matched to the flow of paste (in order to avoid blockages). Relative to the cooling belt located underneath, the rollers are mounted with their axis at an inclination of <90° in the direction of flow. The rollers can also be provided with a non-stick coating.

The impressed product strip is allowed to harden on a cooling belt and at the end of the belt broken down into coarse pieces using a further roller. The resulting fragments are comminuted to form granules along the impressed lines in a sieve granulator, e.g. Frewitt, GLA-ORV-0215 type (4 mm sieve). The mesh size of the sieve is matched to the size of the granules. The fines or finer fragments are then sieved off and separated from the granules.

As an alternative to a sieve granulator, the fragments formed along the impressed lines can be comminuted to form granules of the desired size in a roll crusher or a roll mill. A combination of a roll crusher or roll mill with a sieve granulator is also possible.

The additive granules based on single additives or additive mixtures that can be so produced are suitable for stabilising organic polymers against thermal, oxidative or light-induced degradation. They can be incorporated into polymers, e.g. thermoplastics, especially thermosetting plastics, e.g. based on polyolefins, polyesters, polystyrenes, polyacrylates, polyurethanes, polyamides etc., in a manner known per se using known methods. The granules are also suitable for the preparation of so-called premixes.

The following Examples illustrate the applicability and practicality of the method according to the present invention:

EXAMPLE 1

50 parts of IRGANOX 1010 (pentaerythritol tetrakis[3-(3,5-di-tert-butyl-4-hydroxyphenyl)-propionate]) and 50 parts of IRGANOX 1098 (N,N'-hexane-1,6-diyl-bis[3-(3,5-di-tert-butyl-4-hydroxyphenyl)propionamide]) are mixed homogeneously in a batch mixer. Using a metering apparatus, the mixture is supplied to a Konti kneader (type PR100 7D) volumetrically at a throughput of 50 kg/h. The kneader is temperature-controlled to 100° C. (inlet cooled to 20° C.; shaft 110° C.). The temperature of the mass is 95° C. At a shaft speed of 45 rpm (100 rpm=150 kg/h), the product is extruded through a slot-shaped nozzle (dimensions 40×6 mm). The strand of material is supplied by way of a cooled chute (20° C.) to two cooled (20° C.) squeeze rollers. The squeeze rollers roll the strand of product in the plastic state (1 000 to 10 000 cPas) into a 2 mm thick, approximately 10-15 cm wide strip which is deposited on a cooled metal belt (Sandvik cooling belt; effective width 250 mm; effective length 4000 mm). Above the cooling belt there are mounted two embossing rollers which impress a rhombus structure into the still plastic strip of product. After the impressing, the impressed strip of product hardens on the cooling belt and at the end of the belt breaks into coarse pieces. The impressed fragments are comminuted to form granules along the impressed lines in a sieve granulator (Frewitt type: GLA-ORV-0215; 4 mm sieve). The fines are then sieved off. The granules according to the invention so produced have a uniform shape and exhibit advantageous bulk material properties (Table 1).

TABLE 1

| | |
|---|---|
| Particle size, smallest length | 1.0 mm |
| Particle size, greatest length | 3.0 mm |
| Loose bulk density | 514 g/l |
| Pouring rate ($t_{R15}/t_{R25}$)[2] | 9 sec/2 sec |
| Angle of repose (nozzle 15/25 mm)[1] | 41°/34° |
| Dust emission (5 min)[3] | 0.11% |

[1] according to ISO 4324;
[2] according to DIN 53492;
[3] according to Heubach test

EXAMPLE 2

Using a metering apparatus, 100 parts of IRGANOX 1010 are supplied to a Konti kneader (type PR100 7D) volumetrically at a throughput of 100 kg/h. The kneader is temperature-controlled to 90° C. (inlet cooled to 20° C.; shaft 90° C.). The temperature of the mass is 70° C. At a shaft speed of 45 rpm, the product is extruded through a circular nozzle (diameter 24 mm). The strand of material is supplied by way of a cooled chute (20° C.) to two cooled (20° C.) squeeze rollers. The squeeze rollers roll the strand of product in the plastic state (1 000 to 5 000 cPas) into a 2 mm thick, approximately 10-15 cm wide strip which is deposited on a cooled metal belt (Sandvik cooling belt; effective width 250 mm; effective length 4000 mm). Above the cooling belt there are mounted two embossing rollers which impress a rhombus structure into the still plastic strip of product. After the impressing, the impressed strip of product hardens on the cooling belt and at the end of the belt breaks into coarse pieces. The impressed fragments are comminuted to form granules along the impressed lines in a sieve granulator (Frewift type: GLA-ORV-0215; 4 mm sieve). The fines are then sieved off. The granules according to the invention so produced have a uniform shape and exhibit advantageous bulk material properties (Table 2), especially in comparison with the powder used.

TABLE 2

| | |
|---|---|
| Particle size, smallest length | 2.2 mm |
| Particle size, greatest length | 5.5 mm |
| Loose bulk density | 534 g/l |
| Pouring rate ($t_{R15}/t_{R25}$)[2)] | 37 sec/3 sec |
| Angle of repose (nozzle 15/25 mm)[1)] | 38°/31° |
| Dust emission (5 min)[3)] | 0.065% |

[1)] according to ISO 4324;
[2)] according to DIN 53492;
[3)] according to Heubach test

EXAMPLE 3

5.2 parts of IRGANOX® 1010, 25.8 parts of calcium stearate powder (calcium stearate DW®; FACI, IT) and 69 parts of TINUVIN® 622 (butanedioic acid dimethyl ester, polymer with 4-hydroxy-2,2,6,6-tetramethyl-1-piperidineethanol) are mixed homogeneously in an MTI mixer. Using a metering apparatus, the mixture is supplied to a Konti kneader (type PR100 7D) volumetrically at a throughput of 100 kg/h. The kneader is temperature-controlled to 60° C. (inlet cooled to 20° C.; shaft 60° C.). The temperature of the mass is 50° C. At a shaft speed of 45 rpm, the product is extruded through a circular nozzle (diameter 24 mm). The strand of material is supplied by way of a cooled chute (20° C.) to two cooled (20° C.) squeeze rollers. The squeeze rollers roll the strand of product in the plastic state (1 000 to 5 000 cPas) into a 2 mm thick, approximately 10-15 cm wide strip which is deposited on a cooled metal belt (Sandvik cooling belt; effective width 250 mm; effective length 4000 mm). Above the cooling belt there are mounted two embossing rollers which impress a rhombus structure into the still plastic strip of product. After the impressing, the impressed strip of product hardens on the cooling belt and at the end of the belt breaks into coarse pieces. The impressed fragments are comminuted to form granules along the impressed lines in a sieve granulator (Frewitt type: GLA-ORV-0215; 4 mm sieve). The fines are then sieved off. The granules according to the invention so produced have a uniform shape and exhibit advantageous bulk material properties (Table 3), especially in comparison with the powder used.

TABLE 3

| | |
|---|---|
| Particle size, smallest length | 3.3 mm |
| Particle size, greatest length | 6.6 mm |
| Loose bulk density | 537 g/l |
| Pouring rate ($t_{R15}/t_{R25}$)[2)] | 40 sec/3 sec |
| Angle of repose (nozzle 15/25 mm)[1)] | 45°/33° |
| Dust emission (5 min)[3)] | 0.00% |

[1)] according to ISO 4324;
[2)] according to DIN 53492;
[3)] according to Heubach test

What is claimed is:

1. A method of producing low-dust granules of polymer additives or polymer additive mixtures, wherein granule-forming polymer additives are mixed together, the mixture is converted into a workable mass and pressed through an orifice, and the pre-shaped strand-like extruded mass is cooled and, while still in a workable state, formed into granules by rolling, impressing, cooling and comminuting,
where the rolling is effected by passing the pre-shaped, still plastic material through two or three squeeze rollers with smooth and polished surfaces and the subsequent impressing is effected by processing the rolled out plastic material with one, two or three linearly embossed shaping rollers,
where the material is impressed with a granular structure which provides predetermined breaking points in an impressed product mat and
where the impressed product mat is allowed to harden on a cooling belt followed by comminuting to form granules along the impressed lines.

2. A method according to claim 1, wherein there are mixed together as granule-forming polymer additives phenolic polymer additives of formula (I)

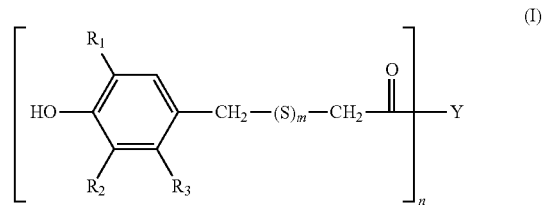

(I)

wherein, independently of one another, one of $R_1$ and $R_2$ is hydrogen, a substituent selected from the group $C_1$-$C_{18}$alkyl, phenyl, ($C_1$-$C_4$alkyl)$_{1-3}$phenyl, phenyl-$C_1$-$C_3$alkyl, ($C_1$-$C_4$alkyl)$_{1-3}$phenyl-$C_1$-$C_3$alkyl, $C_5$-$C_{12}$cycloalkyl and ($C_1$-$C_4$alkyl)$_{1-3}C_5$-$C_{12}$cycloalkyl or a group of partial formula (A)

(A)

wherein $R_a$ is hydrogen or a substituent selected from the group $C_1$-$C_4$alkyl, halogen and sulfo;
and the other is a substituent selected from the group $C_1$-$C_{18}$alkyl, phenyl, ($C_1$-$C_4$alkyl)$_{1-3}$-phenyl, phenyl-$C_1$-$C_3$alkyl, ($C_1$-$C_4$alkyl)$_{1-3}$phenyl-$C_1$-$C_3$alkyl, $C_5$-$C_{12}$cycloalkyl and ($C_1$-$C_4$alkyl)$_{1-3}C_5$-$C_{12}$cycloalkyl or a group of partial formula (A) wherein $R_a$ is as defined;
$R_3$ is hydrogen or methyl;
m is the number zero or 1; and
n is an integer from 1 to 4; wherein,
when n is the number 1,
m is zero or 1 and Y denotes
a monovalent substituent —O—$Y_1$ or —N(—$Y_2$)$_2$, wherein
$Y_1$ is $C_5$-$C_{45}$alkyl, $C_3$-$C_{45}$alkyl interrupted by at least one oxygen atom, $C_5$-$C_{12}$cycloalkyl, $C_2$-$C_{12}$alkenyl, a substituent of partial formula (B)

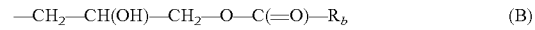

(B)

wherein $R_b$ is hydrogen, $C_1$-$C_8$alkyl, $C_3$-$C_5$alkenyl or benzyl,
a substituent of partial formula (C)

(C)

wherein $R_c$ is hydrogen, $C_1$-$C_{24}$alkyl, $C_5$-$C_{12}$cycloalkyl or phenyl,
a substituent of partial formula (D)

(D)

wherein one of $R_d$ and $R_e$ is hydrogen or methyl and the other is methyl, and $R_f$ is hydrogen or $C_1$-$C_{24}$alkyl, a substituent of partial formula (E)

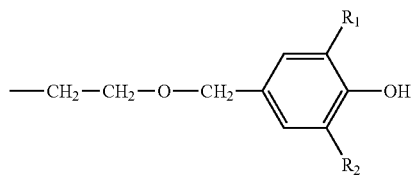

wherein $R_1$ and $R_2$ are as defined above,
or a substituent of partial formula (F)

wherein $R_g$ is hydrogen or $C_1$-$C_{24}$alkyl; and
$Y_2$ is hydroxy-$C_2$-$C_4$alkyl; or,
when n is the number 2,
m is zero and Y is a bivalent group of partial formula (G)

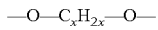

wherein x is an integer from 2 to 20,
a bivalent group of partial formula (H)

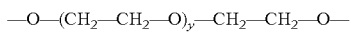

wherein y is an integer from 1 to 30,
or a bivalent group of partial formula (I), (K) or (L)

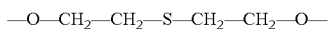

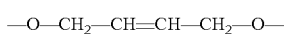

wherein z is zero or an integer from two to ten; or,
when n is the number 3, m is zero and Y is a trivalent group of partial formula (M)

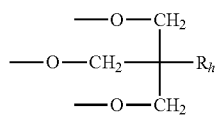

wherein $R_h$ is $C_1$-$C_{24}$alkyl or phenyl, or (N)

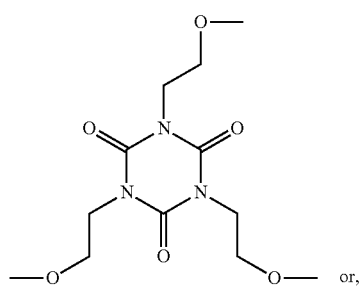

when n is the number 4, m is zero and Y is the tetravalent group of partial formula

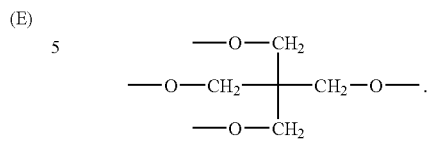

3. A method according to claim 1, wherein there are mixed together as granule-forming polymer additives phenolic polymer additives of formula (I')

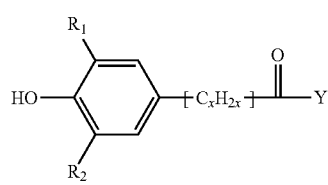

wherein, independently of one another, one of $R_1$ and $R_2$ is hydrogen or $C_1$-$C_4$alkyl and the other is $C_3$-$C_4$alkyl; x is zero (direct bond) or an integer from one to three; and Y is $C_8$-$C_{22}$alkoxy or a group of partial formula (I'A), (I'B) or (I'C)

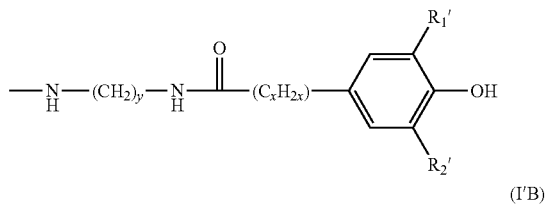

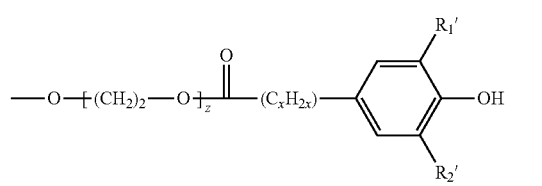

wherein, independently of one another, one of $R_1'$ and $R_2'$ is hydrogen or $C_1$-$C_4$alkyl and the other is $C_3$-$C_4$alkyl; x is zero (direct bond) or an integer from one to three; y is an integer from two to ten and z is an integer from two to six.

4. A method according to claim 1, wherein the mixture of granule-forming polymer additives is converted into a workable mass in a heatable co-kneader.

5. A method according to claim 4, wherein the workable mass is extruded from the co-kneader through a circular nozzle or slot-shaped nozzle and the pre-shaped, strand-like mass is subjected to further processing.

6. A method according to claim 4, wherein the components of the granule-forming polymer additives are fed into the co-kneader in liquid or solid form or in molten form.

7. A method according to claim 1, wherein the impressed product mat is comminuted to granule size in a sieve granulator.

* * * * *